United States Patent
Desai et al.

(10) Patent No.: US 10,911,167 B2
(45) Date of Patent: Feb. 2, 2021

(54) ENHANCED RADIO FREQUENCY (RF) MANAGEMENT USING ACTIVE SENSORS

(71) Applicant: Cisco Technology, Inc., San Jose, CA (US)

(72) Inventors: Vishal S. Desai, San Jose, CA (US); Santosh Babaji Kulkarni, San Jose, CA (US); Benjamin Jacob Cizdziel, San Jose, CA (US); Young Il Choi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/389,250

(22) Filed: Apr. 19, 2019

(65) Prior Publication Data
US 2020/0336226 A1     Oct. 22, 2020

(51) Int. Cl.
*H04B 17/27* (2015.01)
*H04W 64/00* (2009.01)
*H04B 17/318* (2015.01)
*H04B 17/345* (2015.01)

(52) U.S. Cl.
CPC .......... *H04B 17/27* (2015.01); *H04B 17/318* (2015.01); *H04B 17/345* (2015.01); *H04W 64/003* (2013.01)

(58) Field of Classification Search
CPC .... H04B 17/27; H04B 17/318; H04B 17/345; H04W 64/003
See application file for complete search history.

(56) References Cited

U.S. PATENT DOCUMENTS

| | | | |
|---|---|---|---|
| 8,934,369 B2 | 1/2015 | Cao et al. | |
| 9,386,472 B2 | 7/2016 | Prechner et al. | |
| 9,756,403 B2 | 9/2017 | Proud | |
| 2004/0125753 A1* | 7/2004 | Mahany | H04L 1/1685 370/254 |
| 2007/0060098 A1 | 3/2007 | McCoy | |
| 2007/0097921 A1* | 5/2007 | Choi | H04W 36/0016 370/331 |
| 2009/0088166 A1* | 4/2009 | Malik | H04W 36/32 455/437 |

(Continued)

OTHER PUBLICATIONS

Dagres, Loannis et al.; "Flexible and Spectrum Aware Radio Access through Measurements and Modeling in Cognitive Radio Systems"; ICT-248351 Faramir (Jun. 30, 2012) 73 pages.

*Primary Examiner* — Dinh Nguyen
(74) *Attorney, Agent, or Firm* — Merchant & Gould P.C.

(57) ABSTRACT

Enhanced Radio Frequency (RF) management using active sensors may be provided. First, a plurality of user devices may be determined that a first active sensor is to act as an anchor for within a first portion of a Radio Frequency (RF) environment in which the plurality of user devices and the first active sensor are disposed. Next, RF environment data corresponding to the first portion of the RF environment in which the plurality of user devices are disposed may be collected. A report corresponding to the first portion of the RF environment in which the plurality of user devices are disposed may then be created based on the collected RF environment data. The report may be configured to aid in evaluating a link between at least one of the plurality of user devices and a first Access Point (AP). The created report may be provided to the first AP.

20 Claims, 5 Drawing Sheets

(56) References Cited

U.S. PATENT DOCUMENTS

| | | | | |
|---|---|---|---|---|
| 2013/0143592 A1* | 6/2013 | Brisebois | .............. | H04W 24/10 |
| | | | | 455/456.1 |
| 2013/0258872 A1* | 10/2013 | Drake | ................ | H04L 41/0833 |
| | | | | 370/252 |
| 2014/0220974 A1* | 8/2014 | Hsu | .................. | H04W 36/0088 |
| | | | | 455/436 |
| 2015/0043484 A1* | 2/2015 | Jung | .................... | H04W 76/40 |
| | | | | 370/329 |
| 2015/0382148 A1* | 12/2015 | Agarwal | .............. | H04W 4/029 |
| | | | | 455/457 |
| 2016/0088521 A1* | 3/2016 | Ho | ......................... | H04L 43/08 |
| | | | | 455/453 |
| 2016/0128021 A1* | 5/2016 | Wadhawan | .......... | H04W 24/10 |
| | | | | 370/312 |

* cited by examiner

ENHANCED RADIO FREQUENCY (RF) MANAGEMENT USING ACTIVE SENSORS

TECHNICAL FIELD

The present disclosure relates generally to providing Radio Frequency (RF) management.

BACKGROUND

In computer networking, a wireless Access Point (AP) is a networking hardware device that allows a wireless compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where wireless access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Enhanced Radio Frequency (RF) management using active sensors may be provided. First, a plurality of user devices may be determined that a first active sensor is to act as an anchor for within a first portion of a Radio Frequency (RF) environment in which the plurality of user devices and the first active sensor are disposed. Next, RF environment data corresponding to the first portion of the RF environment in which the plurality of user devices are disposed may be collected. A report corresponding to the first portion of the RF environment in which the plurality of user devices are disposed may then be created based on the collected RF environment data. The report may be configured to aid in evaluating a link between at least one of the plurality of user devices and a first Access Point (AP). The created report may be provided to the first AP.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Managing wireless network operations manually is becoming increasingly more difficult for Information Technology (IT) departments. This challenge may be exacerbated by the dense deployment of APs and the large number user devices in an enterprise. Radio Resource Management (RRM) systems and processes may alleviate this problem by allowing a Wireless Local Area Network (WLAN) architecture to monitor Radio Frequency (RF) environments and adjust each AP's power and channel configurations to improve RF coverage and reduce co-channel interference.

RRM may monitor the RF environment by using, for example, Neighbor Discovery Protocol (NDP) packets that may be exchanged between APs. However, APs may be mounted on the ceiling and may have a clear line of sight to each other. This may mean that the RRM system's RF measurements may not account for individual user device Receive (Rx)/Transmit (Tx) sensitivity on the floor. Moreover, NDP messages exchanged between APs may be sent at the same power level and lowest possible rates. This may result in an AP-to-AP RF map that may be fundamentally different from that of user devices using higher rates on the floor. Accordingly, embodiments of the disclosure may provide a process to enhance an RRM system by augmenting it with a floor level RF map using active sensors for example.

Figure 1:
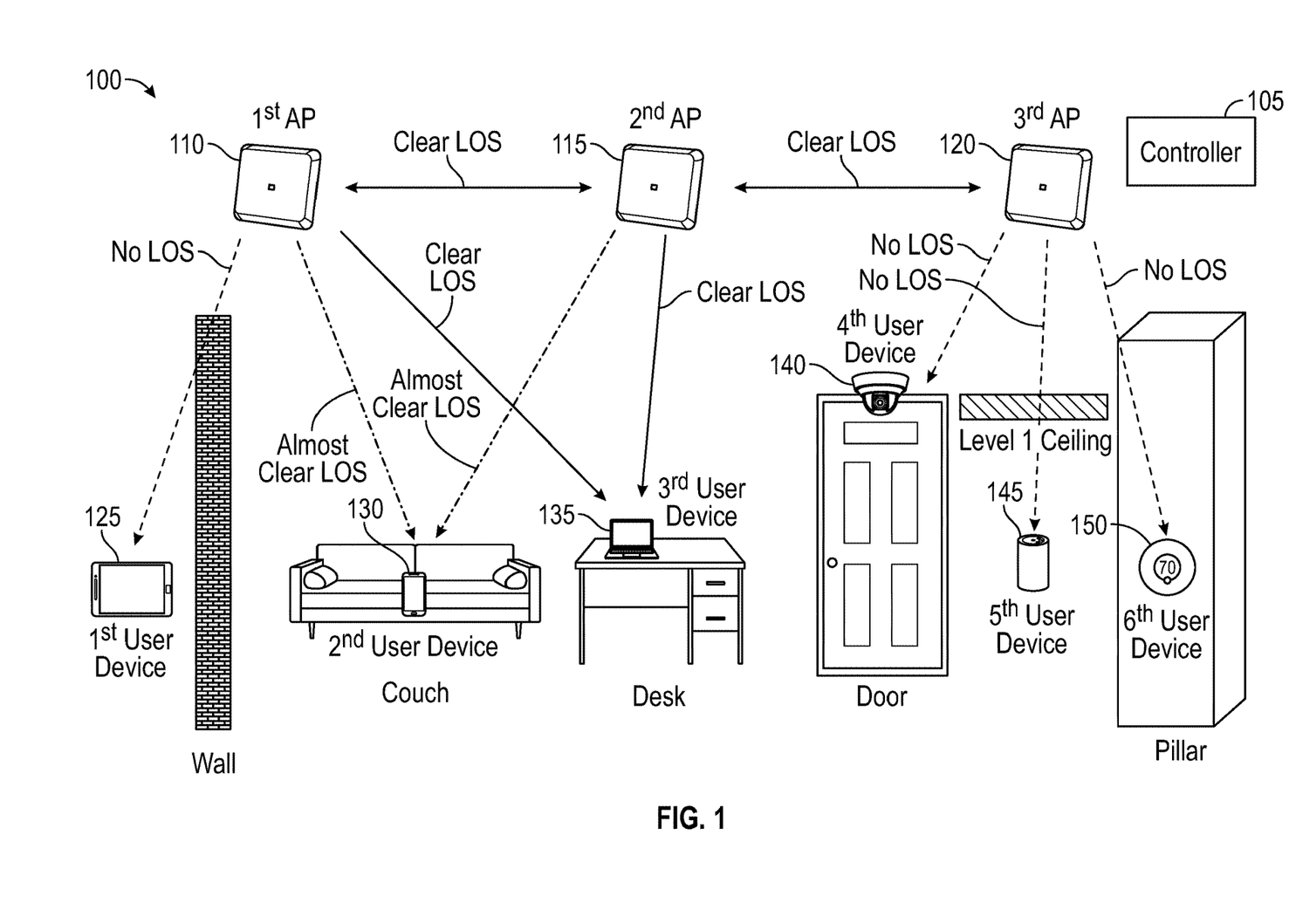
FIG. 1 is a block diagram of an operating environment.

FIG. 1 shows an operating environment 100. As shown in FIG. 1, operating environment 100 may comprise a controller 105 and a plurality of APs. The plurality of APs may comprise a first AP 110, a second AP 115, and a third AP 120. Operating environment 100 may further comprise a first user device 125, a second user device 130, a third user device 135, a fourth user device 140, a fifth user device 145, and a sixth user device 150.

The plurality of APs may allow first user device 125, second user device 130, third user device 135, fourth user device 140, fifth user device 145, and sixth user device 150 to connect to a wired network. Controller 105 may access and control the plurality of APs in order to provide the user devices roaming within operating environment 100.

RRM processes may be performed by controller 105 to provide real-time RF management of operating environment 100. RRM processes may allow controller 105 to continually monitor the plurality of APs, for example, for the following: traffic load, interference, noise, coverage, and other information such as the number of nearby APs. Using this information, RRM processes on controller 105 may periodically reconfigure the plurality APs in operating environment 100 to improve efficiency by providing radio resource monitoring, transmit power control, dynamic channel assignment, and coverage hole detection and correction. As will be described in greater detail below, active sensors may be introduced into operating environment 100 in order to enhance the RRM processes.

As stated above, RRM processes may rely on NDP messages exchanged between APs to build an RF map for the WLAN. As illustrated in FIG. 1, the plurality of AP's may be on the ceiling giving them a relatively good Line-of-Sight (LOS) with each other when compared with the user devices on the floor. Operating environment 100 may include obstacles such as walls, doors, ceilings, and pillars for example. Unlike the clear LOS between the plurality of APs, the obstacles may cause no LOS or an LOS that may be mostly or partially clear as illustrated in FIG. 1.

In addition, the sensitivity and antenna gain of the plurality of APs may also be better than that of the user devices. User device sensitivity may vary from one user device/implementation to another and may be less than that of an AP. How well a user device may hear an AP may be important in the WLAN because the WLAN may rely on contention processes for access. Consequently, the RRM processes may be enhanced by taking the floor level view of the RF environment into consideration. However, user devices may not have the capabilities (e.g., may not support 802.11K standards) or may not implement features (e.g., 802.11k beacon report) that may enable them to report RF measurements at the floor level back to the RRM processes. Accordingly, embodiments of the disclosure may utilize active sensors to overcome this problem as described in greater detail below.

First AP 110, second AP 115, third AP 120, and the user devices of operating environment 100 may use beamforming. Beamforming may comprise a signal processing technique that may be used in sensor arrays comprising a plurality of antennas for directional signal transmission or reception. Any of first user device 125, second user device 130, third user device 135, fourth user device 140, fifth user device 145, and sixth user device 150 may comprise, but is not limited to, a cable modem, a cellular base station, a tablet device, a mobile device, a smart phone, a telephone, a remote control device, a set-top box, a digital video recorder, an Internet-of-Things (IoT) device, a personal computer, a network computer, a mainframe, a router, or other similar microcomputer-based device.

Elements of operating environment 100 (i.e., controller 105, plurality of APs, first user device 125, second user device 130, third user device 135, fourth user device 140, fifth user device 145, and sixth user device 150) may be practiced in hardware and/or in software (including firmware, resident software, micro-code, etc.) or in any other circuits or systems. Elements of operating environment 100 may be practiced in electrical circuits comprising discrete electronic elements, packaged or integrated electronic chips containing logic gates, a circuit utilizing a microprocessor, or on a single chip containing electronic elements or microprocessors. Elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, elements of operating environment 100 may be practiced in a computing device 500.

Figure 2:
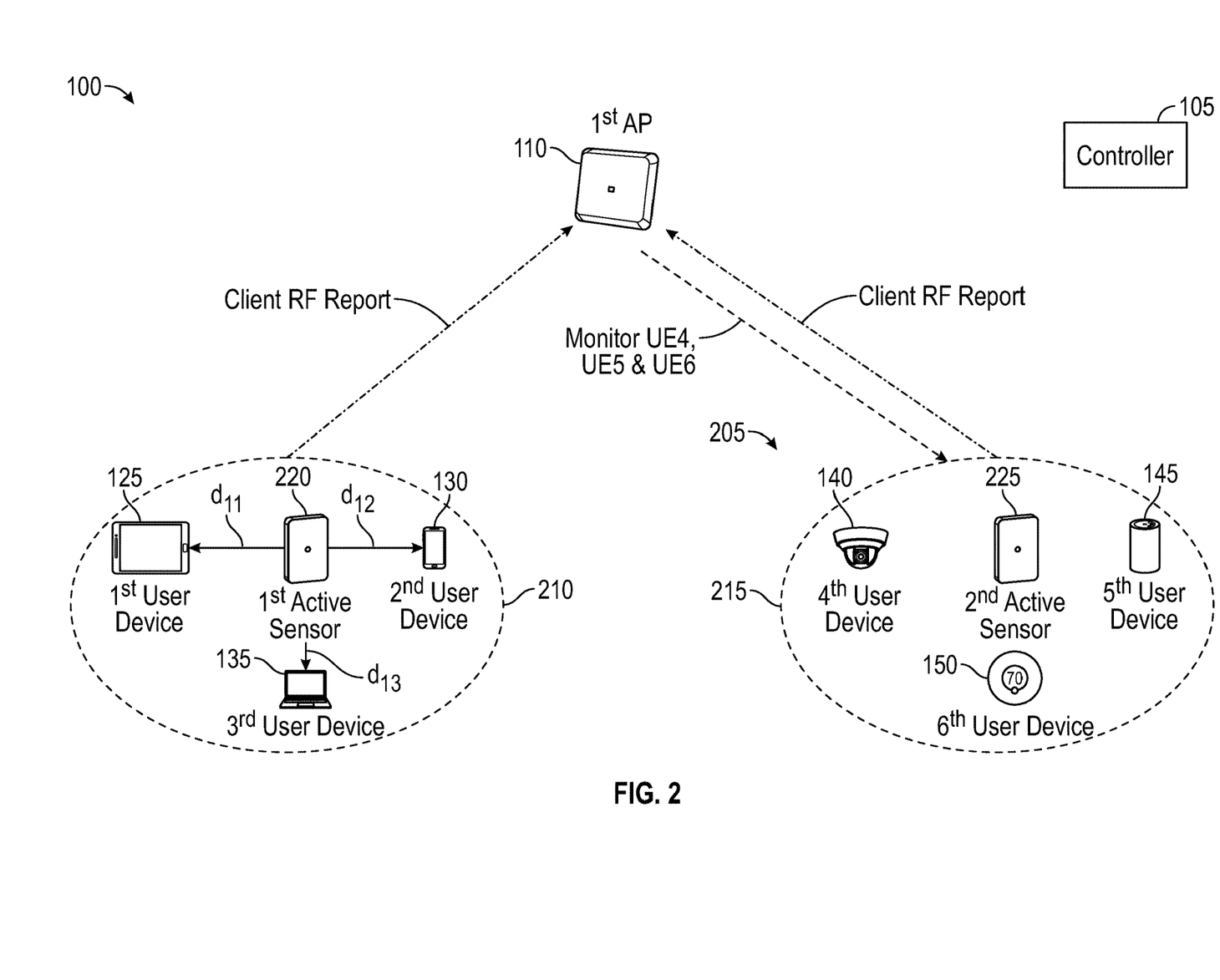
FIG. 2 illustrates active sensors forwarding a report to an AP.

FIG. 2 shows operating environment 100 in the context of active sensors forwarding a report. As shown in FIG. 2, operating environment 100 may comprise an RF environment 205 comprising a first portion 210 and a second portion 215. A first active sensor 220 may correspond to first portion 210 and a second active sensor 225 may correspond to second portion 215. First active sensor 220 and second active sensor 225 may comprise, but are not limited to, 802.11a/b/g/n/ac compliant (e.g., Wave 2) sensors with internal antennas and an Ethernet backhaul that may also be capable of joining an AP as a client. In addition to running network tests like, Internet Protocol (IP) addressing, host reachability, Remote Authentication Dial-In User Service (RADIUS), and Email/Web/File Transfer Protocol (FTP) applications, first active sensor 220 and second active sensor 225 may also report the user device level view (e.g., floor) of RF environment 205 to the RRM process running in operating environment 100.

Figure 3:
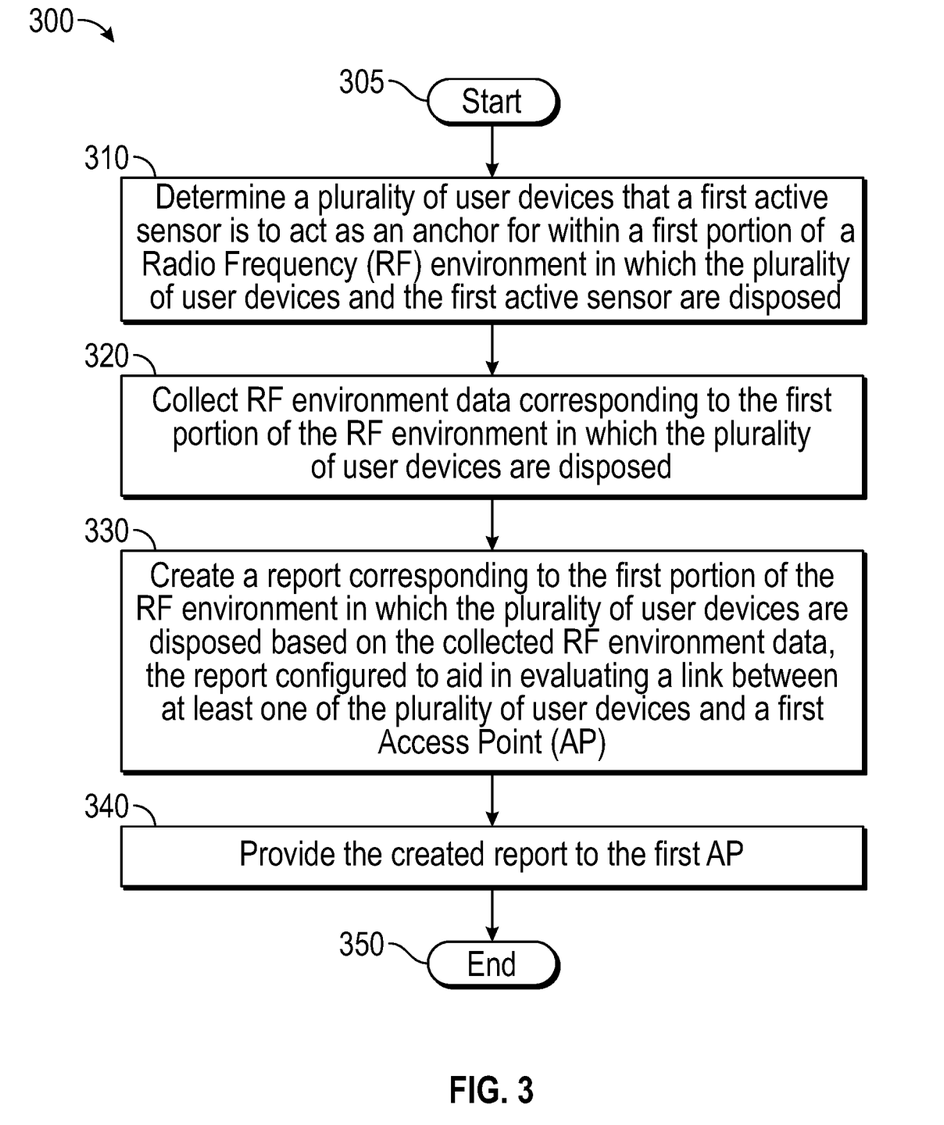
FIG. 3 is a flow chart of a method for providing enhanced Radio Frequency (RF) management using active sensors.

FIG. 3 is a flow chart setting forth the general stages involved in a method 300 consistent with an embodiment of the disclosure for providing RF management using active sensors. Method 300 may be implemented using first active sensor 220 as described in more detail above with respect to FIG. 1 and FIG. 2. Ways to implement the stages of method 300 will be described in greater detail below.

Method 300 may begin at starting block 305 and proceed to stage 310 where it may be determined that first active sensor 220 is to act as an "anchor" for a plurality of user devices within first portion 210 of RF environment 205 in which the plurality of user devices and first active sensor 220 are disposed. As shown in FIG. 2 the plurality of user devices may comprise first user device 125, second user device 130, and third user device 135. For example, first active sensor 220 may determine user devices in its vicinity by estimating their distance to first active sensor 220 based on a Received Signal Strength Indicator (RSSI) that first active sensor 220 overhears from each user device. As shown in FIG. 2, first active sensor may overhear an RSSI from first user device 125, second user device 130, and third user device 130, and estimate their distance to first active sensor 220. First active sensor 220 may provide first AP 110 the Media Access Control (MAC) addresses of first user device 125, second user device 130, and third user device 130. In this way, first active sensor 220 may inform first AP 110 and the RRM processes running on operating environment 100 that first active sensor 220 may be acting as an anchor for first user device 125, second user device 130, and third user device 130. Acting as an anchor for a plurality of user devices may comprise, but is not limited to, the active sensor monitoring a plurality of user devices and reporting RF measurements at a floor level in the vicinity of the plurality of user devices back to an AP or the RRM processes running on operating environment 100. With embodiments of the disclosure, first active sensor 220 may act as an anchor for a neighboring user device when the overheard RSSI exceed a predefined threshold and varies within a specified range for example.

Consistent with other embodiments of the disclosure, first AP 110 may determine the location of user devices if first AP 110 is location capable or through transmit beamforming via sounding frames. For example, if first AP 110 determines that fourth user device 140, fifth user device 145, and sixth user device 150 are in the same vicinity as second active sensor 225, first AP 110 may instruct second active sensor 225 to act as an anchor for fourth user device 140, fifth user device 145, and sixth user device 150. In yet another embodiment, the RRM processes running on operating environment 100 may leverage location services to determine which active sensors are in the vicinity of which user devices. Then the RRM processes running on operating environment 100 may instruct the active sensors which user devices they are to act as anchors for.

From stage 310, where it was determined that first active sensor 220 is to act as the anchor for the plurality of user devices (e.g., first user device 125, second user device 130, and third user device 130), method 300 may advance to stage 320 where first active sensor 220 may collect RF environment data corresponding to first portion 210 of RF environment 205 in which the plurality of user devices are disposed. For example, once the plurality of APs and active sensors (e.g., first active sensor 220 and second active sensor 225) are deployed, the active sensors may act as anchors to their neighboring user devices and periodically send a client level RF report to an AP. The RF environment data used to make the client level RF report may comprise, for example, important client level information. The RF environment data may comprise, but is not limited to: i) an RSSI at which an AP (i.e., first AP 110) is heard; ii) the noise floor in the user devices' vicinity (i.e., first portion 210); iii) other APs (i.e., second AP 115 and third AP 120) and clients heard in the vicinity with their channel and RSSI (e.g., 802.11k beacon report); iv) the number of user devices the active sensor is acting as anchor for; v) the number of collisions and retries overheard for each user device; and vi) pre-configured test data sent at various data rates, among others.

Once first active sensor 220 collects the RF environment data corresponding to first portion 210 of RF environment 205 in which the plurality of user devices are disposed in stage 320, method 300 may continue to stage 330 where first active sensor 220 may create a report corresponding to first portion 210 of RF environment 205 in which the plurality of user devices are disposed based on the collected RF environment data. The report may be configured to aid in evaluating a link between at least one of the plurality of user devices for which first active sensor 220 is acting as anchor and first AP 110. For example, first active sensor 220 may sense and report a user device view (i.e., first user device 125, second user device 130, and third user device 130 view) of RF environment 205 to the RRM processes running on operating environment 100. The RRM processes may then use the report to evaluate AP links to user devices at the floor level in order to optimize user device handovers and transmissions for example.

After first active sensor 220 creates the report in stage 330, method 300 may proceed to stage 340 where first active sensor 220 may provide the created report to first AP 110. In turn, first AP 110 may provide the created report to the RRM processes running on operating environment 100. For example, the report (i.e., client level RF report) may help the RRM processes running on operating environment 100 to evaluate first AP 110's link to the user devices at floor level and optimize its user device handovers and transmissions as well as verify intended improvements through subsequent client RF reports received from first active sensor 220.

When multiple active sensors are present on a given floor, their inputs to the RRM processes may be weighted based on the RF density of the devices around these sensors along with the number of user devices that the active sensor may act as an anchor for. Active sensors acting as anchors for user devices a shorter distance away may have their reports weighted higher than active sensors anchoring user devices a farther distance away because shorter distances may give the active sensor a more accurate representation of the user devices' RF view. Reports from active sensors acting as anchors for a high number of user devices may be weighted higher than those anchoring a low number of user devices. Once active sensor 220 provides the created report to first AP 110 in stage 340, method 300 may then end at stage 350.

Figure 4:
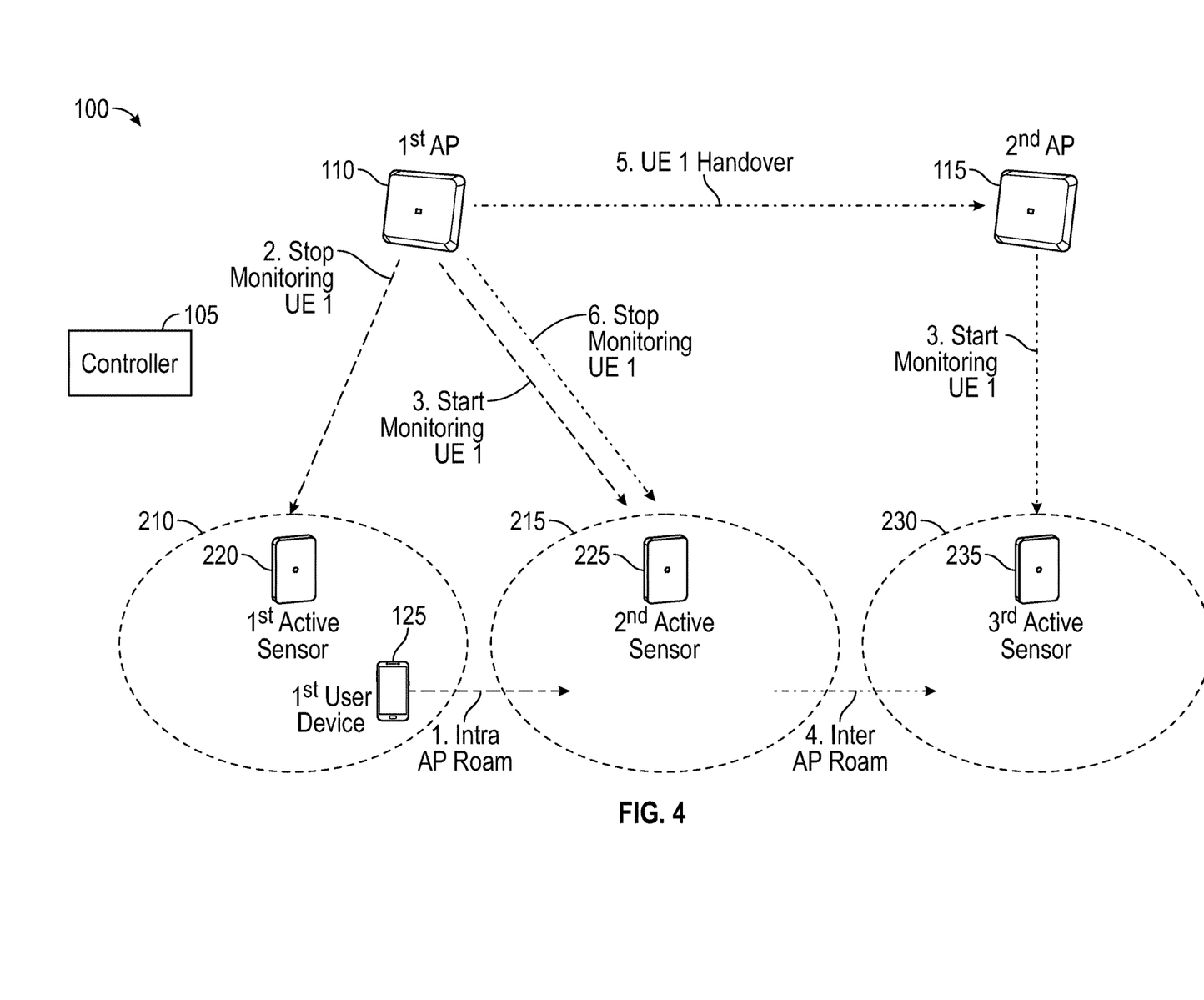
FIG. 4 illustrates handover between active sensors.

FIG. 4 illustrates handover between active sensors. For user devices that are mobile, the RRM processes running on operating environment 100 may also hand off monitoring (i.e., anchoring) duties of the user device from one active sensor to another, both inter and intra AP. As shown in FIG. 4, when first user device 125 roams from first portion 210 to second portion 215, first AP 110 may instruct first active sensor 220 to stop monitoring (i.e., anchoring) first user device 125 and instruct second active sensor 225 to start monitoring first user device 125. When first user device 125 further roams from second portion 215 to a third portion 230, first AP 110 may instruct second active sensor 225 to stop monitoring first user device 125 and may hand first user device 125 off to second AP 115, which may instruct a third active sensor 235 to start monitoring first user device 125.

In addition, active sensors may themselves discover a new client in their vicinity using distance estimation as discussed above. However, with this embodiment, the active sensors may need to periodically prune stale entries in their list of user devices for which they are acting as an anchor when the user device leaves an active sensor's vicinity.

Figure 5:
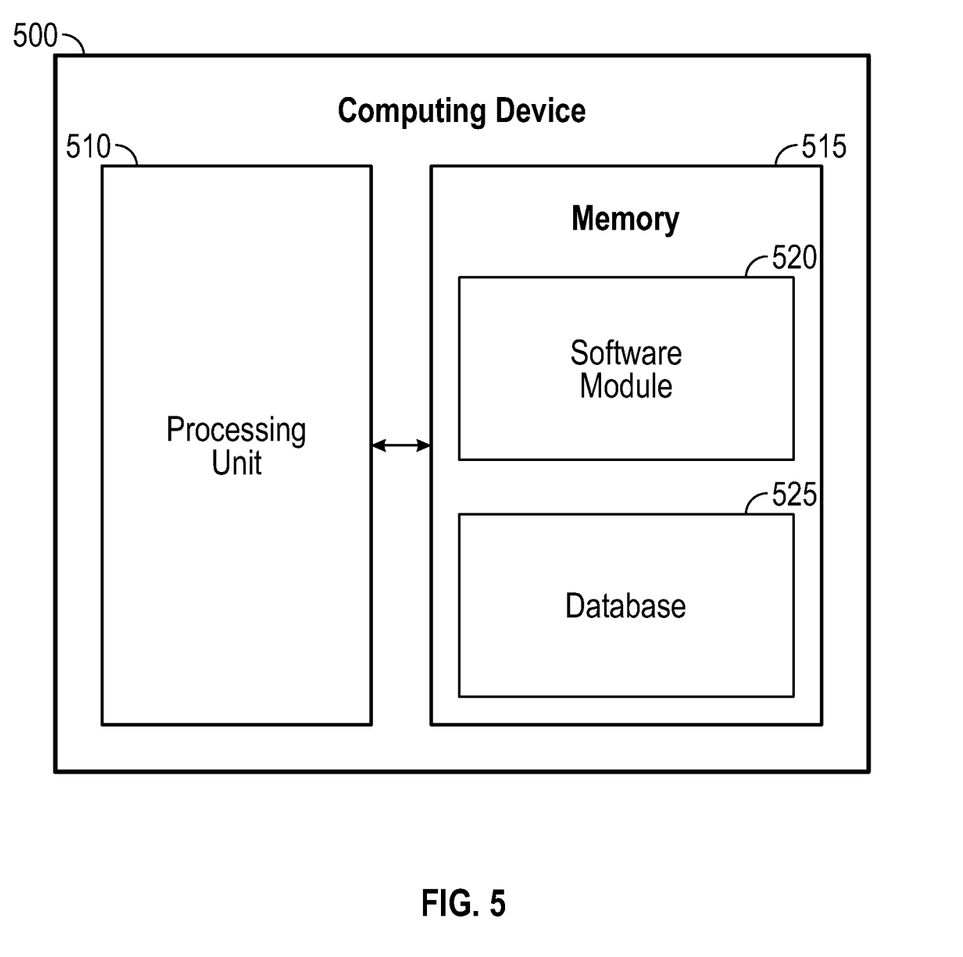
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing RF management using active sensors, including for example, any one or more of the stages from method 300 described above with respect to FIG. 3. Computing device 500, for example, may provide an operating environment for controller 105, plurality of APs, first user device 125, second user device 130, third user device 135, fourth user device 140, fifth user device 145, and sixth user device 150. Controller 105, plurality of APs, first user device 125, second user device 130, third user device 135, fourth user device 140, fifth user device 145, and sixth user device 150 may operate in other environments and are not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining a plurality of user devices that a first active sensor is to act as an anchor for within a first portion of a Radio Frequency (RF) environment in which the plurality of user devices and the first active sensor are disposed, wherein determining the plurality of user devices that the first active sensor is to act as the anchor for comprises:
   estimating a distance of each of the plurality of user devices from overhearing a Received Signal Strength Indicator (RSSI) from each of the plurality of user devices,
   determining the plurality of user devices that the first active sensor is to act as the anchor for based on the determined distance, and
   providing Media Access Control (MAC) addresses of the plurality of user devices the first active sensor is to act as the anchor for to a first Access Point (AP) associated with the plurality of user devices;
   collecting, by the first active sensor, RF environment data corresponding to the first portion of the RF environment in which the plurality of user devices are disposed;
   creating a report corresponding to the first portion of the RF environment in which the plurality of user devices are disposed based on the collected RF environment data, the report configured to aid in evaluating a link between at least one of the plurality of user devices and the first AP; and
   providing the created report to the first AP.

2. The method of claim 1, wherein determining the plurality of user devices that the first active sensor is to act as the anchor for comprises, for each of the plurality of user devices, determining that the overheard RSSI for each of the plurality of user devices exceeds a predefined threshold and varies within a specified range.

3. The method of claim 1, wherein determining the plurality of user devices that the first active sensor is to act as the anchor for comprises, for each of the plurality of user devices, receiving instructions from the first AP based upon the first AP determining that each of the plurality of user devices are located in the first portion of the RF environment.

4. The method of claim 1, wherein determining the plurality of user devices that the first active sensor is to act as the anchor for comprises, for each of the plurality of user devices, receiving instructions from a controller of the first AP based upon the controller of the first AP determining that each of the plurality of user devices are located in the first portion of the RF environment.

5. The method of claim 1, wherein collecting the RF environment data comprises collecting the RF environment data comprising the RSSI at which the first AP is heard by the first active sensor.

6. The method of claim 1, wherein collecting the RF environment data comprises collecting the RF environment data comprising a noise floor in the first portion of the RF environment in which the plurality of user devices are disposed.

7. The method of claim 1, wherein collecting the RF environment data comprises collecting the RF environment data comprising an identity, a channel, and the RSSI of at least one of the following heard by the first active sensor in the first portion of the RF environment: a second AP; and one or more user devices not part of the plurality of user devices that the first active sensor acts as the anchor for.

8. The method of claim 1, wherein collecting the RF environment data comprises collecting the RF environment data comprising a number of user device value corresponding to a number of user devices comprising the plurality of user devices.

9. The method of claim 1, wherein collecting the RF environment data comprises collecting the RF environment data comprising a number of collisions and retries overheard for each of the plurality of user devices.

10. The method of claim 1, wherein collecting the RF environment data comprises collecting the RF environment data comprising pre-configured test data sent at different data rates.

11. The method of claim 1, wherein creating the report comprises creating the report comprising a weighting of the RF environment data wherein the weighting of the RF environment data is positively biased by at least one of the following: the proximity of the user devices in the plurality of user devices to the first active sensor; and the number of user devices comprising the plurality of user devices that the first active sensor acts as the anchor for.

12. The method of claim 1, further comprising handing off a one of the plurality of user devices to a second active sensor when the one of the plurality of user devices roams to a second portion of the RF environment.

13. The method of claim 1, further comprising handing off a one of the plurality of user devices to a second AP and a third active sensor when the one of the plurality of user devices roams to a third portion of the RF environment.

14. A system comprising:
a memory storage; and
a processing unit coupled to the memory storage, wherein the processing unit is operative to:
determine a plurality of user devices that a first active sensor is to act as an anchor for within a first portion of a Radio Frequency (RF) environment in which the plurality of user devices and the first active sensor are disposed, wherein the processing unit being operative to determine the plurality of user devices that the first active sensor is to act as the anchor for comprises the processing unit being operative to:
estimate a distance of each of the plurality of user devices from overhearing a Received Signal Strength Indicator (RSSI) from each of the plurality of user devices,
determine the plurality of user devices that the first active sensor is to act as the anchor for based on the determined distance, and
provide Media Access Control (MAC) addresses of the plurality of user devices the first active sensor is to act as the anchor for to a first Access Point (AP) associated with the plurality of user devices;
collect RF environment data corresponding to the first portion of the RF environment in which the plurality of user devices are disposed;
create a report corresponding to the first portion of the RF environment in which the plurality of user devices are disposed based on the collected RF environment data, the report configured to aid in evaluating a link between at least one of the plurality of user devices and the first AP; and
provide the created report to the first AP.

15. The system of claim 14, wherein the processing unit being operative to collect the RF environment data comprises the processing unit being operative to collect the RF environment data comprising the RSSI at which the first AP is heard by the first active sensor.

16. The system of claim 14, wherein the processing unit being operative to collect the RF environment data comprises the processing unit being operative to collect the RF environment data comprising a noise floor in the first portion of the RF environment in which the plurality of user devices are disposed.

17. A non-transitory computer-readable medium that stores a set of instructions which when executed perform a method comprising:
determining a plurality of user devices that a first active sensor is to act as an anchor for within a first portion of a Radio Frequency (RF) environment in which the plurality of user devices and the first active sensor are disposed, wherein determining the plurality of user devices that the first active sensor is to act as the anchor for comprises
estimating a distance of each of the plurality of user devices from overhearing a Received Signal Strength Indicator (RSSI) from each of the plurality of user devices,
determining the plurality of user devices that the first active sensor is to act as the anchor for based on the determined distance, and
providing Media Access Control (MAC) addresses of the plurality of user devices the first active sensor is to act as the anchor for to a first Access Point (AP) associated with the plurality of user devices;
collecting, by the first active sensor, RF environment data corresponding to the first portion of the RF environment in which the plurality of user devices are disposed;
creating a report corresponding to the first portion of the RF environment in which the plurality of user devices are disposed based on the collected RF environment data, the report configured to aid in evaluating a link between at least one of the plurality of user devices and the first AP; and
providing the created report to the first AP.

18. The non-transitory computer-readable medium of claim 17, wherein determining the plurality of user devices that the first active sensor is to act as the anchor for comprises, for each of the plurality of user devices, determining that the overheard RSSI for each of the plurality of user devices exceeds a predefined threshold and varies within a specified range.

19. The non-transitory computer-readable medium of claim 17, wherein determining the plurality of user devices that the first active sensor is to act as the anchor for comprises, for each of the plurality of user devices, receiving instructions from the first AP based upon the first AP determining that each of the plurality of user devices are located in the first portion of the RF environment.

20. The non-transitory computer-readable medium of claim 17, wherein determining the plurality of user devices that the first active sensor is to act as the anchor for comprises, for each of the plurality of user devices, receiving instructions from a controller of the first AP based upon the controller of the first AP determining that each of the plurality of user devices are located in the first portion of the RF environment.

* * * * *